(12) United States Patent
Nguyen et al.

(10) Patent No.: US 6,691,780 B2
(45) Date of Patent: Feb. 17, 2004

(54) TRACKING OF PARTICULATE FLOWBACK IN SUBTERRANEAN WELLS

(75) Inventors: Philip D. Nguyen, Duncan, OK (US); Jimmie D. Weaver, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 33 days.

(21) Appl. No.: 10/125,171

(22) Filed: Apr. 18, 2002

(65) Prior Publication Data

US 2003/0196800 A1 Oct. 23, 2003

(51) Int. Cl.[7] .................. E21B 43/267; E21B 47/00
(52) U.S. Cl. .................. 166/254.1; 73/152.54; 166/290.1; 166/250.12; 166/280; 507/267; 507/271; 507/272; 507/907; 507/924
(58) Field of Search ............. 166/254.1, 255.1, 166/250.1, 250.12, 280; 73/152.54; 250/259, 260; 436/27, 28; 507/203, 267, 269, 270, 271, 272, 901, 906, 907, 924

(56) References Cited

U.S. PATENT DOCUMENTS

| | | | | |
|---|---|---|---|---|
| 2,869,642 A | * | 1/1959 | McKay et al. | 166/250.01 |
| 3,316,965 A | * | 5/1967 | Watanabe | 166/280 |
| 3,492,147 A | * | 1/1970 | Young et al. | 427/5 |
| 3,863,709 A | * | 2/1975 | Fitch | 165/45 |
| 4,008,763 A | | 2/1977 | Lowe, Jr. | 166/253 |
| 4,415,805 A | * | 11/1983 | Fertl et al. | 250/260 |
| 5,049,743 A | * | 9/1991 | Taylor et al. | 250/303 |
| 5,182,051 A | * | 1/1993 | Bandy et al. | 252/645 |
| 5,439,055 A | * | 8/1995 | Card et al. | 166/280 |
| 5,498,280 A | | 3/1996 | Fistner et al. | 106/19 |
| 5,595,245 A | * | 1/1997 | Scott, III | 166/250.1 |
| 5,604,184 A | | 2/1997 | Ellis et al. | 507/117 |
| 5,609,207 A | | 3/1997 | Dewprashad et al. | 166/276 |
| 5,732,364 A | * | 3/1998 | Kalb et al. | 588/8 |
| 5,783,822 A | | 7/1998 | Buchanan et al. | 250/259 |
| 5,849,590 A | * | 12/1998 | Anderson et al. | 436/27 |
| 5,929,437 A | * | 7/1999 | Elliott et al. | 250/259 |
| 6,047,772 A | | 4/2000 | Weaver et al. | 166/276 |
| 6,074,739 A | | 6/2000 | Katagiri | 428/323 |
| 6,123,871 A | | 9/2000 | Carroll | 252/301.36 |
| 6,172,011 B1 | | 1/2001 | Card et al. | 507/204 |
| 6,192,985 B1 | * | 2/2001 | Hinkel et al. | 166/280 |
| 6,210,471 B1 | | 4/2001 | Craig | 106/31.08 |
| 6,328,105 B1 | | 12/2001 | Betzold | 166/280 |
| 6,439,310 B1 | * | 8/2002 | Scott et al. | 166/308 |
| 6,552,333 B1 | * | 4/2003 | Storm et al. | 250/269.3 |
| 2003/0006036 A1 | * | 1/2003 | Malone et al. | 166/250.12 |

FOREIGN PATENT DOCUMENTS

WO    WO 01/81914    11/2001

\* cited by examiner

*Primary Examiner*—George Suchfield
(74) *Attorney, Agent, or Firm*—Robert A. Kent; Randall C. Brown

(57) ABSTRACT

Compositions and methods for tracking the transport of particulate solids during the production of hydrocarbons from a subterranean formation.

24 Claims, No Drawings

TRACKING OF PARTICULATE FLOWBACK IN SUBTERRANEAN WELLS

BACKGROUND

The present embodiment relates generally to the recovery of hydrocarbons from a subterranean formation penetrated by a well bore and more particularly to non-radioactive compositions and methods of utilizing the non-radioactive compositions for tracking the transport of particulate solids during the production of hydrocarbons from a subterranean formation penetrated by a well bore.

Transport of particulate solids during the production of hydrocarbons from a subterranean formation penetrated by a well bore is a continuing problem. The transported solids can erode or cause significant wear in the hydrocarbon production equipment used in the recovery process. The solids also can clog or plug the well bore thereby limiting or completely stopping fluid production. Further, the transported particulates must be separated from the recovered hydrocarbons adding further expense to the processing. The particulates which are available for transport maybe present due to an unconsolidated nature of a subterranean formation and/or as a result of well treatments placing particulates in a well bore or formation, such as, by gravel packing or propped fracturing.

In the treatment of subterranean formations, it is common to place particulate materials as a filter medium and/or a proppant in the near well bore area and in fractures extending outwardly from the well bore. In fracturing operations, proppant is carried into fractures created when hydraulic pressure is applied to these subterranean rock formations to a point where fractures are developed. Proppant suspended in a viscosified fracturing fluid is carried outwardly away from the well bore within the fractures as they are created and extended with continued pumping. Upon release of pumping pressure, the proppant materials remain in the fractures holding the separated rock faces in an open position forming a channel for flow of formation fluids back to the well bore.

Proppant flowback is the transport of proppants back into the well bore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel.

Current techniques for controlling the flowback of proppants include coating the proppants with curable resin, or blending the proppants with fibrous materials, tackifying agents or deformable particulates (See e.g. U.S. Pat. No. 6,328,105 to Betzold, U.S. Pat. No. 6,172,011 to Card et al. and U.S. Pat. No. 6,047,772 to Weaver et al.) For a multizone well that has been fractured with proppant and is plagued with proppant flowback problems, it is quite difficult to identify the zone from which the proppant is emanating unless the proppant is tagged with a tracer. Radioactive materials have been commonly used in the logging or tagging of sand or proppant placement, however, such radioactive materials are hazardous to the environment and the techniques for utilizing such radioactive materials are complex, expensive and time consuming. Therefore, there is a need for simple compositions and methods for tracking the flowback of proppant in subterranean wells to avoid the above problems.

DETAILED DESCRIPTION

According to one embodiment, metals are tagged onto proppant material or materials to be blended with proppant material to provide for the ready identification of flowback proppant from different stages or zones of the well. Suitable metals for this purpose may be selected from Groups I to VIII of the Periodic Table of the elements as well as the lanthanide series rare earth metals so long as the metals do not constitute a component of the proppant, the fracturing fluid or the reservoir fluid and so long as the metals are compatible with the fracturing fluid. Preferred metals include gold, silver, copper, aluminum, barium, beryllium, cadmium, cobalt, chromium, iron, lithium, magnesium, manganese, molybdenum, nickel, phosphorus, lead, titanium, vanadium and zinc as well as derivatives thereof including oxides, phosphates, sulfates, carbonates and salts thereof so long as such derivatives are only slightly soluble in water so that they remain intact during transport with the proppant from the surface into the fractures. Particularly preferred metals include copper, nickel, zinc, cadmium, magnesium and barium. The metal acts as a tracer material and a different metal is tagged onto the proppant, or onto the materials to be blended with the proppant, so that each proppant stage or each fracturing job treatment can be identified by a unique tracer material. Suitable metals for use as the tracer material are generally commercially available from Sigma-Aldrich, Inc. as well as from Mallinckrodt Baker, Inc. It is understood, however, that field grade materials may also be used as suitable tracer materials for tagging onto proppant material or materials to be blended with proppant material.

Samples of flowback proppant collected from the field may be analyzed according to a process known as the inductively-coupled plasma (ICP) method to determine from which proppant stage and which production zone the proppant has been produced. According to the ICP method, an aqueous sample is nebulized within an ICP spectrophotometer and the resulting aerosol is transported to an argon plasma torch located within the ICP spectrophotometer. The ICP spectrophotomer measures the intensities of element-specific atomic emissions produced when the solution components enter the high-temperature plasma. An on-board computer within the ICP spectrophotomer accesses a standard calibration curve to translate the measured intensities into elemental concentrations. ICP spectrophotometers for use according to the ICP method are generally commercially available from the Thermo ARL business unit of Thermo Electron Corporation, Agilent Technologies and several other companies. Depending upon the model and the manufacturer, the degree of sensitivity of currently commercially available ICP spectrometers can generally detect levels as low as 1 to 5 parts per million for most of the metals listed above.

It is understood that depending on the materials used as tagging agents, other spectroscopic techniques well known to those skilled in the art, including atomic absorption spectroscopy, X-ray fluorescence spectroscopy, or neutron activation analysis, can be utilized to identify these materials.

According to another embodiment, an oil-soluble or oil-dispersible tracer comprising a metal salt, metal oxide, metal sulfate, metal phosphate or a metal salt of an organic acid can be used to tag the proppant by intimately mixing the metal with a curable resin prior to coating the curable resin onto the proppant. Preferably, the metal is selected from the Group VIB metals, the Group VIIB metals, and the lanthanum series rare earth metals. Specifically, the metal according to this embodiment may be chromium, molybdenum, tungsten, manganese, technetium, rhenium, lanthanum, cerium, praseodymium, neodymium, promethium, samarium, europium, gadolinium, terbium, dysprosium, holmium, erbium, thulium, ytterbium and lutetium. It is preferred that the metals according to this embodiment, do not constitute a component of the proppant, the fracturing fluid or the reservoir fluid, and that the metals are compatible with the fracturing fluid.

Preferably, the organic acid is a substituted or unsubstituted carboxylic acid. More preferably, the organic acid may be selected from alkanoic and alkenoic carboxylic acids, polyunsaturated aliphatic monocarboxylic acids and aromatic carboxylic acids. Most preferably, the alkanoic carboxylic acids have from 5 to 35 carbon atoms, the alkenoic carboxylic acids have from 5 to 30 carbon atoms, the polyunsaturated aliphatic monocarboxylic acids maybe selected from the group of sorbic, linoleic, linolenic, and eleostearic acids and the aromatic acids maybe selected from the group of benzoic, salicylic, cinnamic and gallic acids. Suitable organic acids are generally commercially available from Sigma-Aldrich, Inc. as well as from Mallinckrodt Baker, Inc.

For proppant to be coated with a curable resin, the tracer agent is blended homogeneously with the resin mixture and the resin is then coated onto the proppant. The proppant can be pre-coated as in the case of curable resin-coated proppants, for example, such as those commercially available from Santrol or Acme Borden, or it can be coated on-the-fly during the fracturing job treatment. The nature of the resin materials and the processes for performing the coating process is well know to those skilled in the art, as represented by U.S. Pat. No. 5,609,207 to Dewprashad et al., the entire disclosure of which is hereby incorporated herein by reference. Also, it is understood that materials to be blended with proppant such as the fibrous materials, tackifying agents or deformable beads disclosed in U.S. Pat. No. 6,328,105 to Betzold, U.S. Pat. No. 6,172,011 to Card et al. and U.S. Pat. No. 6,047,772 to Weaver et al., the entire disclosures of which are hereby incorporated by reference, can be similarly treated with a tracer agent.

According to still another embodiment, the metal elements or their derivative compounds can be tagged as part of the manufacturing process of proppant. As a result, the proppant is tagged with a permanent tracer.

According to yet another embodiment, the proppant can be coated with phosphorescent, fluorescent, or photoluminescent pigments, such as those disclosed in U.S. Pat. No. 6,123,871 to Carroll, U.S. Pat. No. 5,498,280 to Fistner et al. and U.S. Pat. No. 6,074,739 to Katagiri, the entire disclosures of which are hereby incorporated herein by reference. According to this embodiment, the phosphorescent, fluorescent, or photoluminescent pigments may be prepared from materials well known to those skilled in the art including but not limited to alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors. Suitable phosphorescent, fluorescent and photoluminescent materials are commercially available from Keystone Aniline Corporation (TB Series) and Capricorn Chemicals (H Series and S Series Glowbug Specialty Pigments). The particular structure of the materials has a strong capacity to absorb and store visible light such as sunlight or light from artificial lighting. After absorbing a variety of such common visible light the phosphorescent, fluorescent, or photoluminescent materials will glow in the dark. Various pigment colors can be combined with the luminescent capability of the materials to enhance the differentiation of the stages or zones. According to this embodiment, micron sized particles of the phosphorescent, fluorescent, or photoluminescent materials are intimately mixed with a resin to be coated onto a proppant to be used in a fracturing treatment.

According to still another embodiment, proppant materials having a naturally dark color can be dyed or coated with a marker material having a bright, vivid and intense color which marker material may be selected from oil soluble dyes, oil dispersible dyes or oil dispersible pigments. Suitable oil soluble dyes, oil dispersible dyes and oil dispersible pigments are well known to those skilled in the art and are generally commercially available from Keystone Aniline Corporation and Abbey Color. According to this embodiment, proppant materials having a dark color, such as bauxite proppant which is naturally black in color, are dyed or coated with such marker materials. In this regard, reference is made to the dyes disclosed in U.S. Pat. No. 6,210,471 to Craig, the entire disclosure of which is hereby incorporated herein by reference.

According to all of the above-described embodiments, the proppant material may comprise substantially any substrate material that does not undesirably chemically interact with other components used in treating the subterranean formation. It is understood that the proppant material may comprise sand, ceramics, glass, sintered bauxite, resin coated sand, resin beads, metal beads and the like.

The following examples are illustrative of the methods and compositions discussed above.

EXAMPLE 1

A total of three separate hydraulic fracturing treatments were performed in a subterranean formation penetrated by a well bore. For each fracturing treatment, sufficient metal tracer was added to a liquid hardenable resin to provide an initial concentration of 1000 ppm of the metal tracer in the resin treated proppant. Cuprous oxide, manganese oxide, and zinc oxide were used as tagging agents in fracturing treatments 1, 2, and 3, respectively. Samples of flowback proppant were collected during the flow back of the well. Each proppant sample was weighted and digested in concentrated nitric acid before being measured against known, calibrated metal concentrations according to the Inductive Coupled Plasma (ICP) method for the ARL Model 3410 ICP which is commercially available from the Thermo ARL business unit of Thermo Electron Corporation. Table 1 shows the concentrations of each metal obtained in each proppant flowback sample. The data indicated that the highest concentration of flowback proppant was produced from the interval of the well that was fractured in the second fracturing treatment.

TABLE 1

| Sample Number | Frac Treatment 1 Cu (ppm) | Frac Treatment 2 Mn (ppm) | Frac Treatment 3 Zn (ppm) |
|---|---|---|---|
| 1 | 1.9 | 217.3 | 11.5 |
| 2 | 2 | 219.2 | 11.8 |
| 3 | 2.8 | 120.5 | 9.1 |
| 4 | 3.1 | 204.1 | 12 |
| 5 | 670.6 | 382 | 24.1 |
| 6 | 51.6 | 214.1 | 15.3 |
| 7 | 7.3 | 234.5 | 13.3 |

TABLE 1-continued

| Sample Number | Frac Treatment 1 Cu (ppm) | Frac Treatment 2 Mn (ppm) | Frac Treatment 3 Zn (ppm) |
|---|---|---|---|
| 8 | 2.7 | 437.7 | 17.1 |
| 9 | 2.3 | 183.8 | 11.9 |
| 10 | 2.7 | 220.2 | 12.8 |
| 11 | 2.9 | 465 | 19.3 |
| 12 | 2.1 | 408.1 | 17.4 |
| 13 | 2.7 | 577.2 | 19.3 |
| 14 | 3.1 | 410.2 | 18.2 |
| 15 | 2.3 | 342.9 | 40.2 |
| 16 | 2.1 | 299.8 | 14.9 |
| 17 | 6.5 | 296.8 | 12.5 |
| 18 | 2.1 | 494.8 | 18 |
| 19 | 51 | 385.8 | 16.5 |
| 20 | 2.7 | 443.8 | 17 |
| 21 | 2.8 | 564.8 | 44.6 |
| 22 | 35.5 | 551.8 | 16.1 |
| 23 | 2.4 | 545.8 | 23.3 |
| 24 | 2 | 538.8 | 14.7 |
| 25 | 181 | 342.8 | 16.6 |
| 26 | 1.5 | 119.8 | 10.3 |
| 27 | 1.4 | 34.8 | 11.9 |
| 28 | 1.9 | 204.8 | 43.2 |
| 29 | 2 | 240.8 | 13.7 |
| 30 | 2.4 | 175.8 | 11.3 |
| 31 | 7.5 | 171.8 | 10.9 |
| 32 | 2.3 | 57.8 | 7.7 |
| 33 | 5.8 | 192.8 | 17 |
| 34 | 1.7 | 188.8 | 12.1 |
| 35 | 1.9 | 115.8 | 9.6 |
| 36 | 2.1 | 168.9 | 11.1 |
| 37 | 1.6 | 245.3 | 13 |
| 38 | 1.7 | 173.9 | 11.6 |
| 39 | 1.9 | 219.4 | 12.9 |
| 40 | 1.9 | 224.6 | 12.6 |
| 41 | 2 | 383.3 | 17.1 |
| 42 | 1.7 | 284.7 | 12.5 |
| 43 | 1.9 | 270.6 | 13.4 |
| 44 | 2.4 | 311 | 12.7 |
| 45 | 1.9 | 177.1 | 10.3 |
| 46 | 1.8 | 304.2 | 12.9 |
| 47 | 2.4 | 343.2 | 13.3 |
| 48 | 2 | 308.2 | 12.6 |
| 49 | 5.4 | 241.6 | 11.2 |
| 50 | 3.4 | 209.1 | 11.4 |
| 51 | 3.3 | 217.1 | 11.1 |
| 52 | 1.9 | 299.7 | 12.7 |
| 53 | 2.3 | 228.6 | 11.4 |
| 54 | 1.5 | 162.8 | 10.1 |

EXAMPLE 2

A total of five separate hydraulic fracturing treatments were performed in a subterranean formation penetrated by a well bore. For each fracturing treatment, sufficient metal tracer was added to the liquid hardenable resin to provide an initial concentration of 1000 ppm of the metal tracer in the resin treated proppant. Manganese oxide, cuprous oxide, zinc oxide, magnesium oxide, and barium oxide were used as tagging agents in fracturing treatments 1 through 5, respectively. Samples of flowback proppant were collected during the flow back of the well. Each proppant sample was weighted and digested in concentrated nitric acid before being measured against known, calibrated metal concentrations according to the Inductive Coupled Plasma (ICP) method for the ARL Model 3410 ICP which is commercially available from the Thermo ARL business unit of Thermo Electron Corporation. Table 2 shows the concentrations of each metal obtained in each proppant flowback sample. The data indicated that the highest concentration of flowback proppant was produced from the intervals of the well that were fractured in fracturing treatments 1 and 5.

TABLE 2

| Sample Number | Frac Treatment 1 Mn (ppm) | Frac Treatment 2 Cu (ppm) | Frac Treatment 3 Zn (ppm) | Frac Treatment 4 Mg (ppm) | Frac Treatment 5 Ba (ppm) |
|---|---|---|---|---|---|
| 1 | 256.9 | 7.3 | 18.2 | 26.8 | 106.2 |
| 2 | 210.3 | 14.5 | 23.1 | 24 | 110.6 |
| 3 | 164.5 | 12.4 | 20.2 | 22.5 | 94.8 |
| 4 | 236.5 | 9.1 | 19.9 | 23.3 | 100.4 |
| 5 | 97.8 | 10.5 | 14.7 | 19 | 105.7 |
| 6 | 288.9 | 2.8 | 15.8 | 25.4 | 110.4 |
| 7 | 202.8 | 172.8 | 12.1 | 21.3 | 99.7 |
| 8 | 221.3 | 3 | 12.8 | 22.3 | 115.9 |
| 9 | 167.9 | 2.9 | 12.5 | 21.8 | 115.7 |
| 10 | 236.1 | 2.2 | 12.5 | 22.8 | 90.7 |
| 11 | 162.6 | 1.6 | 10.8 | 19.5 | 85.9 |
| 12 | 111.8 | 1.6 | 8.9 | 18.8 | 74.9 |
| 13 | 231.8 | 1.7 | 11.5 | 21.7 | 86.7 |
| 14 | 246.9 | 2.5 | 13.1 | 24.4 | 98.3 |
| 15 | 348.2 | 2 | 13.5 | 26.8 | 112.8 |
| 16 | 273.5 | 2.4 | 12.4 | 24.4 | 101 |
| 17 | 221.5 | 2 | 11.4 | 29.3 | 83.8 |
| 18 | 268 | 1.4 | 11.9 | 25.8 | 88.4 |
| 19 | 177.8 | 1.8 | 10.4 | 22.3 | 77.8 |
| 20 | 247.5 | 2.4 | 11.3 | 28 | 92.2 |
| 21 | 132.8 | 1.8 | 10 | 22.2 | 72.4 |
| 22 | 165.8 | 2.3 | 9.4 | 20.9 | 75.3 |
| 23 | 306.9 | 66.4 | 11.9 | 28.7 | 103.8 |
| 24 | 205.7 | 1.6 | 9.4 | 23 | 87.1 |
| 25 | 241.2 | 2.6 | 10.6 | 23.4 | 90.4 |
| 26 | 197.6 | 2.2 | 10.1 | 24.1 | 88 |
| 27 | 242 | 2.3 | 10.7 | 26.2 | 98.9 |
| 28 | 202.8 | 3 | 10.8 | 24.6 | 94.6 |
| 29 | 165.7 | 2 | 9 | 20.7 | 85.5 |
| 30 | 138.3 | 1.4 | 8.7 | 21.3 | 76.1 |
| 31 | 227.4 | 1.5 | 10.3 | 24 | 92.8 |
| 32 | 192.1 | 1.7 | 9.8 | 23.5 | 86.6 |
| 33 | 201.9 | 1.2 | 9.6 | 22.3 | 86.4 |
| 34 | 138.4 | 1.7 | 8.6 | 19.8 | 73.9 |

Variations and Equivalents

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A method of treating a subterranean formation having multiple zones penetrated by a well bore comprising:

providing a plurality of particulate compositions comprising a particulate material and a tracking material, wherein the tracking material is selected from the group consisting of substantially non-radioactive metals, substantially non-radioactive metal oxides, substantially non-radioactive metal sulfates, substantially non-radioactive metal carbonates, substantially non-radioactive metal phosphates, substantially non-radioactive metal salts of organic acids, phosphorescent pigments, fluorescent pigments, photoluminescent pigments, oil soluble dyes, oil dispersible dyes and oil dispersible pigments, and wherein each particulate composition comprises a different tracking material;

introducing a different particulate composition into each zone in the subterranean formation through a well bore;

flowing fluid back from the subterranean formation and collecting at least a portion of any particulate compositions which flow back from the subterranean formation; and identifying particulate compositions returned by detecting the tracking compositions.

2. A method of treating a subterranean formation having multiple zones penetrated by a well bore according to claim 1, wherein the tracking material comprises a substantially non-radioactive metal selected from Groups I to VIII of the Periodic Table of the elements and the lanthanide series rare earth metals;

provided that the metal is not a component of the particulate material; and provided that the metal is compatible with the fluids disposed within the well bore.

3. A method of treating a subterranean formation having multiple zones penetrated by a well bore according to claim 1, wherein the tracking material comprises a substantially non-radioactive metal selected from the group consisting of gold, silver, copper, aluminum, barium, beryllium, cadmium, cobalt, chromium, iron, lithium, magnesium, manganese, molybdenum, nickel, phosphorus, lead, titanium, vanadium, zinc and oxide, phosphate, sulfate, carbonate and salt derivatives thereof.

4. A method of treating a subterranean formation having multiple zones penetrated by a well bore according to claim 3, wherein the tracking material comprises a substantially non-radioactive metal selected from the group consisting of copper, nickel, zinc, cadmium, magnesium and barium.

5. A method of treating a subterranean formation having multiple zones penetrated by a well bore according to claim 3, wherein the tracking material comprises a substantially non-radioactive metal oxide selected from the group consisting of manganese oxide, cuprous oxide, zinc oxide, magnesium oxide, and barium oxide.

6. A method of treating a subterranean formation having multiple zones penetrated by a well bore according to claim 1, wherein the tracking material is selected from the group consisting of substantially non-radioactive metal salts, substantially non-radioactive metal oxides, substantially non-radioactive metal sulfates, substantially non-radioactive metal phosphates and substantially non-radioactive metal salts of organic acids and the metal is selected from the group consisting of chromium, molybdenum, tungsten, manganese, technetium, rhenium, lanthanum, cerium, praseodymium, neodymium, promethium, samarium, europium, gadolinium, terbium, dysprosium, holmium, erbium, thulium, ytterbium and lutetium.

7. A method of treating a subterranean formation having multiple zones penetrated by a well bore comprising: providing a plurality of particulate compositions comprising a particulate material and a tracking material, wherein the tracking material comprises a metal salt of an organic acid and the organic acid is selected from the group consisting of substituted and unsubstituted alkanoic carboxylic acids, alkenoic carboxylic acids, polyunsaturated aliphatic monocarboxylic acids and aromatic carboxylic acids, and wherein each particulate composition comprises a different tracking material;

introducing a different particulate composition into each zone in the subterranean formation through a well bore;

flowing fluid back from the subterranean formation and collecting at least a portion of any particulate compositions which flow back from the subterranean formation; and identifying particulate compositions returned by detecting the tracking compositions.

8. A method of treating a subterranean formation having multiple zones penetrated by a well bore according to claim 7, wherein the organic acid comprises an alkanoic carboxylic acid having from 5 to 35 carbon atoms.

9. A method of treating a subterranean formation having multiple zones penetrated by a well bore according to claim 7, wherein the organic acid comprises an alkenoic carboxylic acid having from 5 to 30 carbon atoms.

10. A method of treating a subterranean formation having multiple zones penetrated by a well bore according to claim 7, wherein the organic acid comprises a polyunsaturated aliphatic monocarboxylic acid selected from the group consisting of sorbic acid, linoleic acid, linolenic acid and eleostearic acid.

11. A method of treating a subterranean formation having multiple zones penetrated by a well bore according to claim 7, wherein the organic acid comprises an aromatic acid selected from the group consisting of benzoic acid, salicylic acid, cinnamic acid and gallic acid.

12. A method of treating a subterranean formation having multiple zones penetrated by a well bore according to claim 1, wherein the tracking material is selected from the group consisting of phosphorescent pigments, fluorescent pigments and photoluminescent pigments and wherein the phosphorescent, fluorescent, and photoluminescent pigments are prepared from materials selected from the group consisting of alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors.

13. A method of treating a subterranean formation having multiple zones penetrated by a well bore according to claim 7, wherein the particulate composition further comprises a material selected from the group consisting of fibrous materials, tackifying agents and deformable beads.

14. A method of treating a subterranean formation having multiple zones penetrated by a well bore according to claim 1, wherein the tracking material is blended with a resin to form a tracking material-resin mixture and the particulate material is coated with the tracking material-resin mixture.

15. A method of treating a subterranean formation having multiple zones penetrated by a well bore according to claim 1, wherein the particulate material is tagged with the tracking material.

16. A method of determining the source of particulate returning from propping multiple fractures in a subterranean formation penetrated by a well bore comprising:

placing a proppant composition in each fracture in the subterranean formation, wherein each proppant composition comprises particulate material and a tracking composition coated upon said particulate, wherein the tracking material is selected from the group consisting of substantially non-radioactive metals, substantially non-radioactive metal oxides, substantially non-radioactive metal sulfates, substantially non-radioactive metal carbonates, substantially non-radioactive metal phosphates, substantially non-radioactive metal salts of organic acids, phosphorescent pigments, fluorescent pigments, photoluminescent pigments, oil soluble dyes, oil dispersible dyes and oil dispersible pigments, and wherein each proppant composition comprises a different tracking composition;

flowing fluid back from the subterranean formation and collecting at least a portion of any particulate that flows back from the subterranean formation; and identifying the tracking composition on the returned particulate that flows back from the subterranean formation.

17. A method according to claim 16, wherein the tracking composition is selected from the group consisting of metals, metal salts of organic acids, phosphorescent pigments, fluorescent pigments, photoluminescent pigments, oil soluble dyes, oil dispersible dyes and oil dispersible pigments.

18. A method according to claim 16, wherein the tracking composition comprises a substantially non-radioactive metal selected from Groups I to VIII of the Periodic Table of the elements and the lanthanum series rare earth metals;

provided that the metal is not a component of the particulate material; and provided that the metal is compatible with the fluids disposed within the well bore.

19. A method according to claim 16, wherein the tracking composition comprises a substantially non-radioactive metal selected from the group consisting of gold, silver, copper, aluminum, barium, beryllium, cadmium, cobalt, chromium, iron, lithium, magnesium, manganese, molybdenum, nickel, phosphorus, lead, titanium, vanadium, zinc and oxide, phosphate, sulfate, carbonate and salt derivatives thereof.

20. A method according to claim 19, wherein the tracking composition comprises a substantially non-radioactive metal selected from the group consisting of copper, nickel, zinc, cadmium, magnesium and barium.

21. A method according to claim 19, wherein the tracking composition comprises a substantially non-radioactive metal oxide selected from the group consisting of manganese oxide, cuprous oxide, zinc oxide, magnesium oxide, and barium oxide.

22. A method according to claim 19, wherein the tracking composition is selected from the group consisting of substantially non-radioactive metal salts, substantially non-radioactive metal oxides, substantially non-radioactive metal sulfates, substantially non-radioactive metal phosphates and substantially non-radioactive metal salts of organic acids and the metal is selected from the group consisting of chromium, molybdenum, tungsten, manganese, technetium, rhenium, lanthanum, cerium, praseodymium, neodymium, promethium, samarium, europium, gadolinium, terbium, dysprosium, holmium, erbium, thulium, ytterbium and lutetium.

23. A method according to claim 16, wherein the tracking composition comprises a metal salt of an organic acid and the organic acid is selected from the group consisting of substituted and unsubstituted alkanoic carboxylic acids, alkenoic carboxylic acids, polyunsaturated aliphatic monocarboxylic acids and aromatic carboxylic acids.

24. A method according to claim 16, wherein the tracking composition is selected from the group consisting of phosphorescent pigments, fluorescent pigments and photoluminescent pigments and wherein the phosphorescent, fluorescent, and photoluminescent pigments are prepared from materials selected from the group consisting of alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors.

* * * * *